(12) United States Patent
Tai et al.

(10) Patent No.: US 7,674,400 B2
(45) Date of Patent: Mar. 9, 2010

(54) LIGHT-EMITTING BODY DISPERSED WITH PHOSPHOR PARTICLES, METHOD FOR PRODUCING SAME AND MATERIAL OR ARTICLE CONTAINING SUCH LIGHT-EMITTING BODY

(75) Inventors: Nobuaki Tai, Tokyo (JP); Ryuichi Nakamura, Tokyo (JP); Juichi Ino, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 157 days.

(21) Appl. No.: 11/662,156

(22) PCT Filed: Sep. 16, 2005

(86) PCT No.: PCT/JP2005/017154

§ 371 (c)(1),
(2), (4) Date: Mar. 7, 2007

(87) PCT Pub. No.: WO2006/038449

PCT Pub. Date: Apr. 13, 2006

(65) Prior Publication Data

US 2007/0257232 A1    Nov. 8, 2007

(30) Foreign Application Priority Data

Oct. 5, 2004 (JP) .............................. 2004-292687
Jan. 19, 2005 (JP) .............................. 2005-011983

(51) Int. Cl.
C09K 11/08 (2006.01)
C09K 11/79 (2006.01)
C09K 11/80 (2006.01)
C09K 11/84 (2006.01)
C09K 11/64 (2006.01)
C08K 3/22 (2006.01)
C08L 101/00 (2006.01)

(52) U.S. Cl. .................. 252/301.4 R; 252/301.4 S; 252/301.4 F; 252/301.36; 428/690; 428/372; 428/402; 501/12; 501/32; 106/31.64; 106/31.32

(58) Field of Classification Search .......... 252/301.4 R, 252/301.4 S, 301.4 F, 301.36; 428/690, 372, 428/402; 501/12, 32; 106/31.64, 31.32
See application file for complete search history.

(56) References Cited

U.S. PATENT DOCUMENTS 3,370,971 A    2/1968 Linton
6,167,110 A * 12/2000 Possin et al. ................. 378/19
6,197,710 B1 * 3/2001 Ohara et al. .................... 501/4
6,303,527 B1 * 10/2001 Pinckney ........................ 501/5
6,514,609 B1    2/2003 Siggel et al.
6,673,437 B2    1/2004 Kohla et al.
7,122,129 B2 * 10/2006 Yagi et al. ............. 252/301.4 F
7,282,713 B2 * 10/2007 Jiang et al. ............... 250/361 R
2004/0021407 A1 * 2/2004 Baillie et al. ................ 313/111
2005/0040366 A1 * 2/2005 Yagi et al. .............. 252/301.36

FOREIGN PATENT DOCUMENTS

| JP | 51-83889 A | 1/1975 |
|---|---|---|
| JP | 51-83889 | 7/1976 |
| JP | 63-317582 | 12/1988 |
| JP | 63-317582 A | 12/1988 |
| JP | 3-54126 A | 3/1991 |
| JP | 10-101371 | 4/1998 |
| JP | 10-101371 A | 4/1998 |
| JP | 11-288785 A | 10/1999 |
| JP | 2001-162993 | 6/2001 |
| JP | 2001-162993 A | 6/2001 |
| JP | 2002-105409 A | 4/2002 |
| JP | 2003-246981 | 9/2003 |
| JP | 2003-246981 A | 9/2003 |
| JP | 2003-535954 | 12/2003 |
| JP | 2003-535954 A | 12/2003 |
| JP | 2004-292599 A | 10/2004 |
| JP | 2005-154642 | 6/2005 |
| JP | 2005-154642 A | 6/2005 |
| JP | 2005-264099 | 9/2005 |
| JP | 2005-264099 A | 9/2005 |
| WO | WO 99/37836 A1 | 7/1999 |
| WO | WO 2003/083010 A | 9/2003 |
| WO | WO 03/083010 | 10/2003 |

* cited by examiner

*Primary Examiner*—C. Melissa Koslow
(74) *Attorney, Agent, or Firm*—Hamre, Schumann, Mueller & Larson, P.C.

(57) ABSTRACT

The present invention provides a light-emitting body in which fine phosphor particles are dispersed in an oxide matrix, with the fine phosphor particles containing at least one selected from oxides and oxysulfides as a parent material. When this light-emitting body is dispersed in a resin, a resin composition having excellent transparency can be obtained. This light-emitting body can be produced by: preparing a gel through a sol-gel process in which a raw material solution containing a compound that supplies metal atoms composing the fine phosphor particles is used; and heating the gel at 400° C. or higher, for example. Preferably, the light-emitting body has a shape of a flake or fiber.

27 Claims, 2 Drawing Sheets

LIGHT-EMITTING BODY DISPERSED WITH PHOSPHOR PARTICLES, METHOD FOR PRODUCING SAME AND MATERIAL OR ARTICLE CONTAINING SUCH LIGHT-EMITTING BODY

TECHNICAL FIELD

The present invention relates to light-emitting bodies containing fine phosphor particles dispersed therein and methods for producing the same. Furthermore, the present invention relates to materials or articles such as resin compositions, coating materials, ink compositions, coated papers, etc. that contain the light-emitting bodies.

BACKGROUND ART

Generally, phosphors are opaque polycrystals having particle diameters of several micrometers to several hundreds of micrometers. They can be obtained by doping, for example, rare earth ions as an activator into a parent material such as silicate, aluminate, oxysulfide, etc. Major applications of phosphors are fluorescent lamps and various displays. Phosphors also are used for fluorescent display tubes, intensifying screens for radiography, fluorescent screens for radiography, markings for preventing forgery, solid-state lasers, etc. Recently, fine phosphor particles with submicron to nano sizes also are synthesized (see Toshiyuki MASUI, Nobuhito IMANAKA, "Recent Advance in Rare Earth Phosphor Fine Particle", Materials Integration, 2004, vol. 17, No. 3, pp. 10-14). So far, phosphors have been made finer for the purpose of improving the characteristics of existing devices, which is typified by an increase in screen display definition of displays, for example.

Furthermore, recently, upconversion emission in which red, blue, and green visible lights are generated by infrared irradiation is studied with various phosphors (Taiju TSUBOI, "Multi-Photon Excited Luminescence by Rare-Earth Ions", Materials Integration, 2004, vol. 17, No. 3, pp. 36-44).

WO99/37836 (JP2002-501126A) discloses light-emitting fibers in which inorganic light-emitting pigments are dispersed.

JP11(1999)-288785A discloses an optically functional thin film that has a porous layer composed mainly of Si on a substrate and a structure in which fine phosphor particles are dispersed in the porous layer.

JP2002-105409A discloses a coating composition containing an organic binder as well as fibers that contain a fiber-forming material and a light-emitting dye or light-emitting pigment dispersed therein.

JP2004-292599A discloses upconversion fine phosphor particles characterized in that the general formula thereof is expressed by a composition formula of $(R_{1-x}, Er_x)_2O_3$ (where R denotes at least one of Y, La, Gd, and Lu, while X denotes the molar amount and satisfies the range of $0.001 \leq X \leq 0.20$), and they are excited by light with a wavelength in the range of 500 nm to 2000 nm and thereby undergo upconversion emission.

DISCLOSURE OF INVENTION

In the existing devices, phosphor layers containing fine phosphor particles are used as light-emitting bodies but the transparency thereof has not necessarily been considered as important. However, when the transparency of light-emitting bodies containing fine phosphor particles is improved, there is a possibility that new light-emitting devices can be obtained.

Furthermore, phosphors such as those described above may tend to deteriorate depending on the environment of use. Accordingly, in order to apply the phosphors to various fields, it also is important to improve the chemical stability thereof.

Hence, an object of the present invention is to provide light-emitting bodies that have excellent transparency and chemical stability while containing fine phosphor particles used therein, and methods suitable for producing the same. Another object of the present invention is to provide useful materials or articles that contain the above-mentioned light emitting bodies.

In order to achieve the above-mentioned object, the present invention provides a light-emitting body containing fine phosphor particles dispersed in an oxide matrix. The fine phosphor particles contain at least one selected from an oxide and an oxysulfide as a parent material.

Furthermore, the present invention provides a resin composition, a coating material, an ink composition, and a coated paper, each of which contains the light-emitting body described above.

In addition, the present invention provides a method for producing a light-emitting body containing fine phosphor particles dispersed in an oxide matrix. The method includes: preparing a gel through a sol-gel process in which a raw material solution containing a compound that supplies a metal atom composing the fine phosphor particles is used; and heating the gel at 400° C. or higher.

The present invention can provide a light-emitting body that has excellent transparency while containing phosphors having an existing composition used therein. In addition, since the fine phosphor particles are dispersed in an oxide matrix, a light-emitting body with higher chemical stability can be obtained. Such a light-emitting body is suitable for coating materials, resins, ink compositions, and coated papers.

A resin composition of the present invention has excellent transparency and can be used as a member of a new light-emitting device. In the production method of the present invention, since the fine phosphor particles are formed in a dispersed state throughout a matrix, there is no need to include a process of dispersing, in the matrix, fine phosphor particles that have been prepared separately. Thus, a light-emitting body can be obtained in which fine phosphor particles are dispersed easily and rationally. This method is suitable for the production of a light-emitting body having excellent transparency and containing fine phosphor particles with smaller diameters dispersed in an oxide matrix.

DESCRIPTION OF THE PREFERRED EMBODIMENTS

Figure 1:
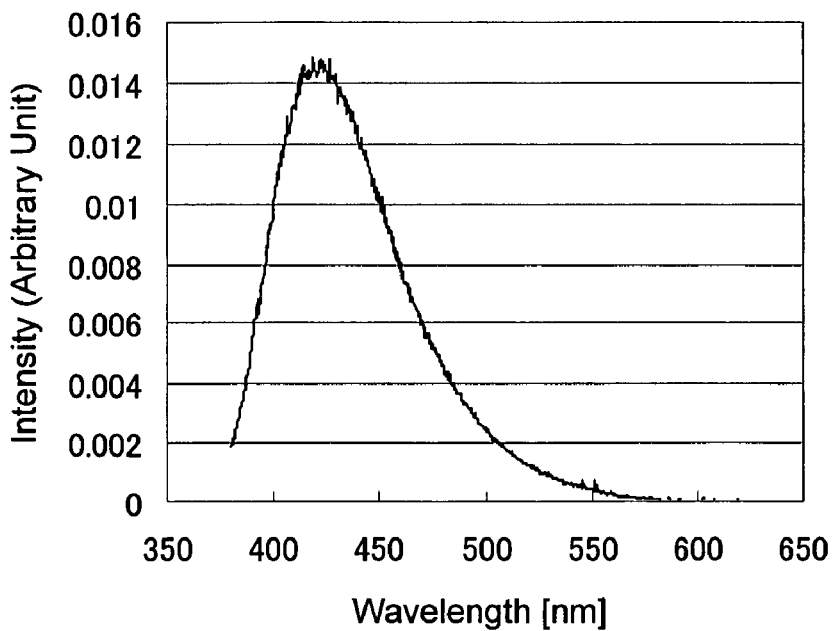
FIG. 1 shows an emission spectrum of a light-emitting body according to Example 8.

The parent material suitable for the phosphors that are contained in the fine phosphor particles can be at least one selected from silicate, aluminate, and oxysulfide. The silicate is at least one selected from $Ca_2Al_2SiO_7$ and $Y_2SiO_5$, for example. The aluminate is at least one selected from $MgAl_2O_4$, $SrAl_2O_4$, $Sr_4Al_{14}O_{25}$, $BaMg_2Al_{16}O_{27}$, and $Y_3Al_5O_{12}$, for example. The oxysulfide is $Y_2O_2S$ or $La_2O_2S$, for example. Preferably, the activator element suitable for the phosphors that are contained in the fine phosphor particles contains at least one selected from Ce, Eu, Tb, Mn, and Mg.

The phosphors that are contained in the fine phosphor particles are not particularly limited. Examples thereof include $Ca_2Al_2SiO_7:Ce^{3+}$; $MgAl_2O_4:Eu^{2+}$; $SrAl_2O_4:Eu^{2+}$; $Sr_4Al_{14}O_{25}:Eu^{2+}$; $BaMg_2Al_{16}O_{27}:Eu^{2+}$, $Mn^{2+}$; $Y_3Al_5O_{12}:Ce^{3+}$; $Y_2SiO_5:Ce^{3+}$, $Tb^{3+}$; Mg coactivated $Y_2O_2S:Eu^{3+}$; and $La_2O_2S:Eu^{3+}$.

The oxide matrix is not particularly limited. It can contain an organic material or can be composed substantially of an inorganic oxide. Preferably, the oxide matrix is an oxide having high transparency with respect to visible light (having translucency), for example, one selected from silicon oxide and aluminum oxide. In the present specification, the term "substantially" denotes that impurity substances that inevitably get incorporated and those that are difficult to remove industrially can be contained. Preferably, the content of such impurity substances is limited to 5 mass % or less.

The light-emitting body of the present invention has high visible light transmittance and excellent transparency when the fine phosphor particles have diameters of 1 μm or smaller, preferably 300 nm or smaller, more preferably 100 nm or smaller, and particularly preferably 50 nm or smaller, for example, 1 nm or larger but 50 nm or smaller. When the fine phosphor particles have smaller diameters, the size of the light-emitting body itself can be reduced. As a result, a light-emitting body can be obtained that has a size suitable to be contained in, for example, coating materials, ink compositions, resin compositions, or coated papers.

In the light-emitting body of the present invention, the content of the fine phosphor particles is preferably 0.1 mol % to 70 mol % and more preferably 0.5 mol % to 40 mol % with respect to the whole. When the content of the fine phosphor particles is too small, the emission intensity decreases. On the other hand, when it is too large, the transparency of the light-emitting body may deteriorate. Furthermore, the emission intensity does not increase, considering the use of a large amount of expensive rare-earth elements.

In the light-emitting body of the present invention, fine phosphor particles of an upconversion type can be used that can emit visible light by infrared or near-infrared exciting light.

The activator element contained in the fine phosphor particles is not particularly limited, as long as it is a rare earth element that allows upconversion emission to occur. Such a rare earth element that is used suitably is at least one selected from erbium (Er), holmium (Ho), praseodymium (Pr), thulium (Tm), neodymium (Nd), gadolinium (Gd), europium (Eu), ytterbium (Yb), samarium (Sm), and cerium (Ce). Among them, Er that exhibits green emission with high visibility is preferable.

A parent material composed substantially of an oxide, particularly a parent material composed of yttria ($Y_2O_3$) is suitable for an upconversion phosphor.

The light-emitting body of the present invention can be produced by a known method such as a sol-gel process, a coprecipitation method, a method in which water glass is used (see, for example, JP46(1971)-9555B), a liquid phase depositing (LPD) method (see, for example, JP3(1991)-54126A), a CVD method, etc. A method in which a solution is used is preferable since fine phosphor particles that are the source of emission, and an oxide matrix that is a skeleton of a light-emitting body can be produced simultaneously. Among the above, the sol-gel process is particularly simple and suitable.

The sol-gel process allows a membranous or fibrous oxide matrix to be obtained easily. In the sol-gel process, the following respective steps are carried out and thereby a glassy oxide matrix can be obtained. Mainly, the case where a membranous oxide matrix is produced is described hereafter.

(1) Preparation of Raw Material Solution
(2) Formation of Gel Body
(3) Drying of Gel Body
(4) Baking of Gel Body (1) Preparation of Raw Material Solution For the raw material solution that is used in the sol-gel process, a hydrolysable and polycondensable organometallic compound is used. For example, metal alkoxides are used that are typified by silicon alkoxides such as tetramethoxysilane (TMOS), tetraethoxysilane (TEOS), etc. and aluminum alkoxides such as aluminum isopropoxide, aluminum ethoxide, etc. It also is possible to use a mixture of silicon alkoxide and aluminum alkoxide.

An additive may be added to the raw material solution as required. The type of the additive is not particularly limited. For example, a surfactant, fatty acid, a carboxyl group-containing organic compound, an amino group-containing organic compound and/or a sulfur compound can be used.

Fibers and/or fine particles made of silica or alumina may be added, as a material composing an oxide matrix, to the raw material solution that is used in the sol-gel process. Furthermore, for example, a colloidal silica alumina sol may be added in which such fine particles are dispersed. When fine particles are added in this manner, the gel film formed can be dried quickly and thereby the productivity improves. Moreover, since a part of the materials composing the oxide matrix can be composed of inexpensive fine particles, cost reduction also can be achieved.

The raw material solution can be prepared by, for example, mixing a first solution containing a compound that supplies metal atoms composing fine phosphor particles with a second solution containing an organometallic compound that forms the oxide matrix. The second solution can contain an organometallic compound that has been hydrolyzed beforehand, fine particles, and/or fibers.

In preparing the raw material solution in the sol-gel process, the raw material solution may be stirred with various stirring means, for example, a magnetic stirrer, a propeller stirrer, a homogenizer, a ball mill, a vibrating ball mill, a planetary ball mill, a sand mill, a colloid mill, or a roller mill.

(2) Formation of Gel Body

The raw material solution that has been prepared is applied onto, for example, a film to form a membranous gel body. The method of applying the raw material solution is not particularly limited, as long as it is suitable for obtaining the intended film form. Specific examples thereof include a bar coating method, a dipping method, a casting method, a spin coating method, a spray method, etc.

(3) Drying of Gel Body

The gel body obtained through the sol-gel process is dried. Preferably, it is dried by heating. However, the drying method is not limited thereto. For example, an evaporator, spray drying, vacuum drying, or freeze-drying also can be employed.

(4) Baking of Gel Body

The gel body that has been dried is heat-treated in order to remove impurities and improve the crystallinity of the fine phosphor particles. The temperature to be used for the heat treatment is at least 400° C. and the upper limit thereof is approximately 1200° C. The temperature range is more preferably 500° C. to 1100° C. and most preferably 800° C. to 1000° C. This heat-treatment allows impurities to be removed and thereby improves emission characteristics. When the heating temperature is lower than 400° C., crystallization of the fine phosphor particles may not be promoted sufficiently and thereby weak emission results. When the heating temperature exceeds 1200° C., oxides of the oxide matrix fuse with each other and thereby it becomes difficult to crush. This is the reason why the heating temperature is limited to the range described above. In addition, the atmosphere to be employed for the heat treatment is preferably atmospheric air since it is easy to use. However, the atmosphere is not limited thereto. For instance, inactive gas such as nitrogen, argon, etc., mixed gas such as nitrogen 97%+hydrogen 3%, etc., or water vapor also can be used. Particularly, the reduction effect of the mixed gas or water vapor can prevent $Eu^{2+}$ from changing to a trivalent form, and thus the emission characteristics improve. In this manner, the light-emitting body of the present invention can be obtained.

Furthermore, the size and shape of the light-emitting body obtained can be adjusted as required. For instance, in the case of a flake-shaped light-emitting body, the average particle diameter thereof can be adjusted to a predetermined range.

<Fibrous Oxide Matrix>

When a fibrous oxide matrix is intended to be obtained, the following method can be employed. For example, when the viscosity of the raw material solution is adjusted through, for example, reduction in water content therein, fiber can be formed from a sol solution. In order to adjust the viscosity thereof, it is necessary to allow hydrolysis to take place in the sol solution until immediately before the sol solution is gelled, and then to allow the portion of the sol solution that is subjected to fiber formation to gel immediately after the start of fiber formation and to form a fiber.

When the water content is reduced, it takes a longer time to hydrolyze the raw material solution. Hence, for instance, when the raw material solution is allowed to contain metal alkoxide, alcohol, water, and nitric acid, a sol solution can be obtained that allows a fiber to be formed in a relatively short time. When this sol solution is refluxed at a boiling point of alcohol and thereby alcohol is extracted, the viscosity of the sol solution can be adjusted to a range that allows a fiber to be formed, in a relatively short time. The viscosity that allows a fiber to be formed is a log $\eta$(d·Pa·sec) value of approximately 1.

The shape and size of the light-emitting body are not particularly limited. However, when it is in the form of powder, flake, fiber, etc., it is easy to disperse it in resins, coating materials, ink compositions, or coated papers.

With respect to the size of the light-emitting body, when the light-emitting body is in the form of powder or flake, the average particle diameter thereof is preferably 100 μm or smaller, more preferably 50 μm or smaller, and most preferably 20 μm or smaller. When the light-emitting body is in the form of fiber, the fiber diameter is 30 μm or smaller, while the fiber length is preferably 25 mm or shorter and further preferably 1 mm or shorter.

The light-emitting body of the present invention is formed of an oxide matrix. Accordingly, it is chemically stable and undergoes less deterioration from the irradiation of energy rays such as electron rays, ions, ultraviolet rays, etc. and the heat treatment.

The light-emitting body of the present invention is excellent in emission performance. Even if a low-energy excitation light source such as a black light is used, a practically sufficient emission can be obtained. The black light is not particularly limited. Examples thereof include a black light that has the peak wavelength at 352 nm and emits light in the range of 300 nm to 420 nm, a black light that has the peak wavelength at 368 nm and emits light in the range of 330 nm to 410 nm, etc. Furthermore, an ultraviolet LED also can be used that has the peak wavelength at 385 nm and emits light in the range of 370 nm to 430 nm.

<Application of Light-Emitting Body>

This light-emitting body is applicable to various uses such as resin compositions, coating materials, ink compositions, coated papers, etc. as in the case of conventional phosphors.

<Application to Resin Composition>

When this light-emitting body is used for a resin composition, it is preferable that a thermosetting resin or a thermoplastic resin be used as the parent resin. Particularly, the use of a thermoplastic resin allows injection molding to be employed and thereby molded articles with complicated shapes can be obtained.

Examples of the thermosetting resin include the following: unsaturated polyester resin, epoxy resin, vinyl ester resin, acrylic resin, UV curable resin, phenolic resin, melamine resin, urea resin, polyimide resin, polyurethane resin, diallyl phthalate resin, etc.

Examples of the thermoplastic resin include the following: an ethylene vinyl acetate copolymer, ethylene vinyl alcohol copolymer resin, vinyl chloride resin, chlorinated polyethylene, cellulose acetate resin, polyvinyl alcohol resin, polyacetal resin, polyamide resin, polyarylate resin, thermoplastic polyurethane elastomer, thermoplastic elastomer, liquid crystal polymer, polyetherether ketone, polysulfone, polyethersulfone, high-density polyethylene, low-density polyethylene, linear low-density polyethylene, polyethylene terephthalate, polycarbonate, polystyrene, polyphenylene ether, polyphenylene oxide, polyphenylene sulfide, polybutadiene, polybutylene terephthalate, polypropylene, cycloolefin, ionomer resin, methacrylic resin, polymethylpentene, biodegradable plastic, etc.

One or more selected from a curing agent, a curing accelerator, a diluent, a polymerizable diluent, a plasticizer, and a weatherproof agent may be added suitably to the resin composition together with a resin.

The resin composition of the present invention has excellent transparency when high transparency of the light-emitting body of the present invention is exhibited therein. According to the present invention, the transparency of the resin composition can be improved up to a degree that makes it possible to obtain a light transmittance of at least 80%, preferably at least 85%, and more preferably at least 90% at a wavelength of 550 nm with respect to the thickness direction when it is formed to have a thickness of 1 mm.

The content of the light-emitting body in the resin composition of the present invention is preferably 0.1 mass % to 70 mass %. When the content is less than 0.1 mass %, emission is difficult to observe visually. When the content exceeds 70 mass %, the emission intensity does not increase and the original property of the resin may be impaired. The resin composition of the present invention can maintain a light transmittance as high as the above-mentioned degree even when the content of the light-emitting body is about 1 mass % or more, preferably about 2 mass % or more. In an embodiment, the resin composition contains at least 1 mass % of the light-emitting body.

<Application to Molded Article>

When this light-emitting body is used for an artificial marble molded article, it is preferable that a three-layer structure be employed, including a transparent gelcoat layer as the outermost layer, an intermediate layer containing the light-emitting body therein, and an artificial marble layer containing an aggregate under the intermediate layer. In this three-layer structure, since the outermost layer is the transparent gelcoat layer, the part located on the inner side thereof is reflected to the appearance and thereby the strong light reflected by the intermediate layer and the pattern of the artificial marble layer combine to form a marble-style appearance having unique light emission.

It is preferable that the thickness of the transparent gelcoat layer be 0.3 mm to 0.7 mm in consideration of providing a sense of depth and decreasing the visible light transmittance. The component of the transparent gelcoat layer is not particularly limited but a thermosetting resin is preferable in view of easy handling and high processability and moldability thereof Specific examples thereof include unsaturated polyester resin, vinyl ester resin, epoxy resin, urethane resin, phenolic resin, or mixtures or modified products (for instance, a modified product obtained by replacing the end group of unsaturated polyester resin by an acrylic group) thereof. Particularly, unsaturated polyester resin is preferable due to its high transparency, inexpensiveness, and availability.

The intermediate layer is intended to provide the marble-style appearance with unique sense of brightness. Accordingly, it is better for the intermediate layer to be one that does not cover the pattern of the artificial marble layer. Hence, it is required to have at least visible light transparency. However, it is not necessary to use the same material as that of the transparent gelcoat that is the outermost layer, as its main component. Additionally, a layer other than the above-mentioned intermediate layer may be provided between the transparent gelcoat layer and the artificial marble layer, as long as the appearance is not impaired. Specifically, when a colored film with high visible light transparency is disposed, the color tone of the artificial marble molded article can be adjusted easily.

Preferably, the intermediate layer has a thickness in the range of 0.05 mm to 1 mm, and a thermosetting resin with high visible light transparency is suitable as a constituent thereof In addition to the light-emitting body, a curing agent or an accelerator may be added. Furthermore, a viscosity improver, a thixotropic agent, an antifoaming agent, or a property improver may be added as required.

The artificial marble layer has preferably a thickness of 3 mm to 25 mm. The main component thereof is a thermosetting resin, and other components contained therein include an aggregate, an accelerator, and/or a curing agent. For this thermosetting resin, the thermosetting resin of the above-mentioned transparent gelcoat layer can be used. An example thereof is unsaturated polyester resin. The aggregate can be an inorganic material such as glass frit, white marble, aluminum hydroxide, calcium carbonate, silica powder, etc., or an organic material such as thermoplastic polyester resin, etc. Furthermore, glass fibers may be added as a reinforcement material if necessary.

When the mixing ratio of the light-emitting body in the intermediate layer is excessively low, it is difficult to obtain a sufficiently high emission. On the other hand, when it is excessively high, problems arise in cost, physical property, etc. Accordingly, the mixing ratio of the light-emitting body in the intermediate layer is preferably 0.01 parts by mass to 10 parts by mass with respect to 100 parts by mass of thermosetting resin.

Preferably, the shape of the light-emitting body that is used for the artificial marble molded article has an average thickness of 0.5 μm to 30 μm and an average particle diameter of 10 μm to 100 μm. When the average particle diameter exceeds 100 μm, cracks tend to occur in the process of molding the intermediate layer. On the other hand, when it is smaller than 10 μm, emission deteriorates considerably. Furthermore, one with an average thickness of less than 0.5 μm tends to be crushed. On the other hand, when the average thickness exceeds 30 μm, a smaller number of particles of the light-emitting body are contained in the intermediate layer and cause poor emission, and thereby inadequate appearance tends to result.

<Application to Coating Material>

When the light-emitting body is used in a coating material, the parent resin to be used is preferably a thermosetting resin or a thermoplastic resin.

Examples of the thermosetting resin include the following: acrylic resin, polyester resin, epoxy resin, phenolic resin, urea resin, fluorine resin, polyester-urethane curable resin, epoxy-polyester curable resin, acrylic-polyester resin, acrylic-urethane curable resin, acrylic-melamine curable resin, polyester-melamine curable resin, etc. The curing agent for the thermosetting resin to be used herein is preferably polyisocyanate, amine, polyamide, polybasic acid, acid anhydride, polysulfide, trifluoroborate, acid dihydrazide, or imidazole, for example.

Examples of the thermoplastic resin include the following: polyethylene resin, polypropylene resin, petroleum resin, thermoplastic polyester resin, thermoplastic fluorine resin, etc.

Preferably, the content of the light-emitting body in the coating material is adjusted so as to be 0.1 mass % to 30 mass % in the coating film after it is dried and cured. More preferably, the content is 1 mass % to 20 mass %. When the content of the light-emitting body is less than 0.1 mass %, weak emission results. On the other hand, when it is more than 30 mass %, the emission intensity does not increase considering the content.

Generally, an excessively large content of the phosphors may impair the color tone of the base material. However, the light-emitting body of the present invention that is composed mainly of a transparent base does not impair the color tone of the base material. Accordingly, the light-emitting body of the present invention can be contained and used in coating materials with various colors. It can be used in a coating material with not only a primary color such as red, blue, green, or black but also a pastel color whose tone is difficult to adjust, for instance.

<Application to Ink Composition>

When this light-emitting body is used in an ink composition, the ink composition is not particularly limited. Examples thereof include inks for writing materials such as various ballpoint pens or fiber-tip pens and printing inks such as gravure inks or offset inks.

Examples of the vehicles to be contained in inks for writing materials include those composed of: acrylic resin, a styrene-acrylic copolymer, polyvinyl alcohol, polyacrylate, an acrylic-vinyl acetate copolymer, microorganism-produced polysaccharide such as xanthan gum, etc., or water-soluble plant polysaccharide such as guar gum, etc.; and a solvent such as water, alcohol, hydrocarbon, ester, etc.

Examples of the vehicles to be contained in gravure inks include those composed of: gum rosin, wood rosin, tall oil rosin, lime rosin, rosin ester, maleic acid resin, polyamide resin, vinyl resin, nitrocellulose, cellulose acetate, ethyl cellulose, chlorinated rubber, cyclized rubber, ethylene-vinyl acetate copolymer resin, urethane resin, polyester resin, alkyd resin, a resin mixture such as gilsonite, dammar, shellac, etc., a mixture of any of the resins mentioned above, or an aqueous emulsion resin or a water-soluble resin obtained by water-solubilizing any one of the resins described above; and a solvent such as hydrocarbon, alcohol, ether, ester, water, etc.

Examples of the vehicles to be contained in offset inks include those composed of: a resin such as rosin modified phenolic resin, petroleum resin, alkyd resin, dry modified resin thereof, etc.; a vegetable oil such as linseed oil, tung oil, soy oil, etc.; and a solvent such as n-paraffin, isoparaffin, aromatic, naphthene, alpha-olefin, water, etc. Furthermore, conventional additives such as dyes, pigments, various surfactants, lubricants, antifoaming agents, leveling agents, etc. can be selected suitably to be mixed with the above-mentioned various vehicle components.

When this light-emitting body is used in an ink composition, it is preferable that it have an average thickness of 0.2 μm to 2 μm and an average particle diameter of 100 μm or smaller. When the average thickness exceeds 2 μm, the light-emitting body appears to protrude and the smoothness is impaired, with respect to the appearance of handwriting. Similarly, when the average particle diameter exceeds 100 μm, the smoothness of handwriting is impaired.

<Application to Coated Paper>

When the light-emitting body is used in a coated paper, first, a solution is prepared by mixing a solvent such as water, a surfactant, and an adhesive made of, for example, copolymer latex, starch, alkali salt of stearic acid or alkali salt of lauryl acid. If necessary, an antioxidant, an ultraviolet absorber, a water-resistant agent, an antiseptic fungicide, a disinfectant, an antifoaming agent, a perfume, and/or a dye can be contained to the solution. Subsequently, this solution is applied to one or both surfaces of base paper using a coating device such as a blade coater, air-knife coater, roll coater, curtain coater, bar coater, gravure coater, size press coater, etc. to form a single layer or two layers or more. Thus, a coated paper with strong emission can be obtained.

Hereinafter, the present invention is described further in detail using examples and comparative examples. However, like the above, the following is mere descriptions of examples of preferred embodiments of the present invention and does not limit the present invention.

EXAMPLES

Example 1

<<Preparation of $Ca_2Al_2SiO_7:Ce^{3+}/SiO_2$ Light-Emitting Body>>

A solution (1) was prepared by dissolving 0.828 g of aluminum nitrate nonahydrate (reagent; with a purity of at least 99.9%), 0.349 g of calcium acetate (reagent; with a purity of at least 99.9%), 0.0144 g of cerium nitrate hexahydrate (reagent; with a purity of at least 99.9%), and 0.168 g of TMOS (Trade Name: KBM04, manufactured by Shin-Etsu Chemical Co., Ltd.), in 14.9 g of purified water. Separately, a solution (2) was prepared by dissolving 24.339 g of TMOS (Trade Name: KBM04, manufactured by Shin-Etsu Chemical Co., Ltd.) in a solvent composed of 1.008 g of 60% nitric acid and 109.26 g of purified water. The solution (1) was added to the solution (2) and then this was mixed with a stirrer. Thereafter, it was aged at 50° C. for approximately 15 hours and then was dried at 120° C. Thus transparent dried gel was obtained. This dried gel was heat-treated at 900° C. for three hours and thereby a sample was obtained. In this sample, $Ca_2Al_2SiO_7$:$Ce^{3+}$ fine phosphor particles are present in a ratio of 3.55 mol % with respect to the whole.

Example 2

<<Preparation of $MgAl_2O_4:Eu^{2+}/SiO_2$ Light-Emitting Body>>

A solution (solution (1)) was prepared by dissolving 0.829 g of aluminum nitrate nonahydrate (reagent; with a purity of at least 99.9%), 0.237 g of magnesium acetate tetrahydrate (reagent; with a purity of at least 99.9%), and 0.0133 g of europium acetate tetrahydrate (reagent; with a purity of at least 99.9%), in 10.835 g of purified water. Separately, a solution (2) was prepared by dissolving 24.692 g of TMOS (Trade Name: KBM04, manufactured by Shin-Etsu Chemical Co., Ltd.) in a solvent composed of 1.023 g of 60% nitric acid and 109.38 g of purified water. The solution (1) was added to the solution (2) and then this was mixed with a stirrer. Thereafter, it was aged at 50° C. for approximately 15 hours and then was dried at 120° C. Thus transparent dried gel was obtained. This dried gel was heat-treated at 900° C. for three hours and thereby a sample was obtained. In this sample, $MgAl_2O_4$:$Eu^{2+}$ fine phosphor particles are present in a ratio of 2.02 mol % with respect to the whole.

Example 3

<<Preparation of $SrAl_2O_4:Eu^{2+}/SiO_2$ Light-Emitting Body>>

A solution (solution (1)) was prepared by dissolving 0.823 g of aluminum nitrate nonahydrate (reagent; with a purity of at least 99.9%), 0.226 g of strontium acetate (reagent; with a purity of at least 99.9%), and 0.0132 g of europium acetate tetrahydrate (reagent; with a purity of at least 99.9%), in 10.759 g of purified water. Separately, a solution (2) was prepared by dissolving 24.52 g of TMOS (Trade Name: KBM04, manufactured by Shin-Etsu Chemical Co., Ltd.) in a solvent composed of 1.016 g of 60% nitric acid and 108.58 g of purified water. The solution (1) was added to the solution (2) and then this was mixed with a stirrer. Thereafter, it was aged at 50° C. for approximately 15 hours and then was dried at 120° C. Thus transparent dried gel was obtained. This dried gel was heat-treated at 900° C. for three hours and thereby a sample was obtained. In this sample, $SrAl_2O_4$:$Eu^{2+}$ fine phosphor particles are present in a ratio of 2.02 mol % with respect to the whole.

Example 4

<<Preparation of $Y_3Al_5O_{12}:Ce^{3+}/SiO_2$ Light-Emitting Body>>

A solution (solution (1)) was prepared by dissolving 3.449 g of aluminum nitrate nonahydrate (reagent; with a purity of at least 99.9%), 1.865 g of yttrium acetate tetrahydrate (reagent; with a purity of at least 99.9%), and 0.024 g of cerium nitrate hexahydrate (reagent; with a purity of at least 99.9%), in 48.665 g of purified water. Separately, a solution (2) was prepared by dissolving 20.316 g of TMOS (Trade Name: KBM04, manufactured by Shin-Etsu Chemical Co., Ltd.) in a solvent composed of 0.842 g of 60% nitric acid and 30.782 g of purified water. The solution (1) was added to the solution (2) and then this was mixed with a stirrer. Thereafter, it was aged at 50° C. for approximately 15 hours and then was dried at 120° C. Thus transparent dried gel was obtained. This dried gel was heat-treated at 900° C. for three hours and thereby a sample was obtained. In this sample, $Y_3Al_5O_{12}$:$Ce^{3+}$ fine phosphor particles are present in a ratio of 10.03 mol % with respect to the whole.

Example 5

<<Preparation of $Y_2SiO_5:Ce^{3+}$, $Tb^{3+}/SiO_2$ Light-Emitting Body>>

A solution (1) was prepared by dissolving 2.339 g of yttrium acetate tetrahydrate (reagent; with a purity of at least 99.9%), 0.105 g of cerium nitrate hexahydrate (reagent; with a purity of at least 99.9%), 0.325 g of terbium acetate tetrahydrate (reagent; with a purity of at least 99.9%), and 0.526 g of TMOS (Trade Name: KBM04, manufactured by Shin-Etsu Chemical Co., Ltd.), in a solvent composed of 1.874 g of 60% nitric acid and 36.735 g of purified water. Separately, a solution (2) was prepared by dissolving 19.991 g of TMOS (Trade Name: KBM04, manufactured by Shin-Etsu Chemical Co., Ltd.) in a solvent composed of 0.829 g of 60% nitric acid and 23.665 g of purified water. The solution (1) was added to the solution (2) and then this was mixed with a stirrer. Thereafter, it was aged at 50° C for approximately 15 hours and then was dried at 120° C. Thus transparent dried gel was obtained. This dried gel was heat-treated at 1000° C. for three hours and thereby a sample was obtained. In this sample, $Y_2SiO_5:Ce^{3+}$, $Tb^{3+}$ fine phosphor particles are present in a ratio of 7.99 mol % with respect to the whole.

Example 6

<<Preparation of Mg coactivated $Y_2O_2S:Eu^{3+}/SiO_2$ Light-Emitting Body>>

A solution (solution (1)) was prepared by dissolving 2.201 g of yttrium acetate tetrahydrate (reagent; with a purity of at least 99.9%), 0.035 g of magnesium acetate tetrahydrate (reagent; with a purity of at least 99.9%), and 0.131 g of europium acetate tetrahydrate (reagent; with a purity of at least 99.9%), in a solvent composed of 1.763 g of 60% nitric acid and 34.566 g of purified water. Separately, a solution (2) was prepared by dissolving 21.286 g of TMOS (Trade Name: KBM04, manufactured by Shin-Etsu Chemical Co., Ltd.) in a solvent composed of 0.882 g of 60% nitric acid and 25.192 g of purified water. Thereafter, the solution (1) was added to the solution (2) and then this was mixed with a stirrer. Furthermore, 1.147 g of flower of sulfur (reagent; with a purity of at least 99.9%) was added to this solution and was dispersed. This was aged at 50° C. for approximately 15 hours and then was dried at 120° C. Thus dried gel was obtained. This dried gel was heat-treated at 900° C. for three hours and thereby a sample was obtained. In this sample, Mg coactivated $Y_2O_2S:Eu^{3+}$ fine phosphor particles are present in a ratio of 6.83 mol % with respect to the whole.

Comparative Example 1

A solution (solution (1)) was prepared by dissolving 0.024 g of cerium nitrate hexahydrate (reagent; with a purity of at least 99.9%) in 48.665 g of purified water. The solution (1) was added to a solution (2) prepared by dissolving 20.316 g of TMOS (Trade Name: KBM04, manufactured by Shin-Etsu Chemical Co., Ltd.) in a solvent composed of 0.842 g of 60% nitric acid and 30.782 g of purified water. Then this was mixed with a stirrer. Thereafter, it was aged at 50° C. for approximately 15 hours and then was dried at 120° C. Thus transparent dried gel was obtained. This dried gel was heat-treated at 900° C. for three hours and thereby a sample was obtained.

Comparative Example 2

A solution (solution (1)) was prepared by dissolving 0.133 g of europium acetate tetrahydrate (reagent; with a purity of at least 99.9%) in 10.835 g of purified water. The solution (1) was added to a solution (2) prepared by dissolving 24.692 g of TMOS (Trade Name: KBM04, manufactured by Shin-Etsu Chemical Co., Ltd.) in a solvent composed of 1.023 g of 60% nitric acid and 109.38 g of purified water. Then this was mixed with a stirrer. Thereafter, it was aged at 50° C. for approximately 15 hours and then was dried at 120° C. Thus transparent dried gel was obtained. This dried gel was heat-treated at 900° C. for three hours and thereby a sample was obtained.

Comparative Example 3

A solution (solution (1)) was prepared by dissolving 0.105 g of cerium nitrate hexahydrate (reagent; with a purity of at least 99.9%) and 0.325 g of terbium acetate tetrahydrate (reagent; with a purity of at least 99.9%), in 9.028 g of purified water. The solution (1) was added to a solution (2) prepared by dissolving 19.991 g of TMOS (Trade Name: KBM04, manufactured by Shin-Etsu Chemical Co., Ltd.) in a solvent composed of 0.829 g of 60% nitric acid and 23.665 g of purified water. Then this was mixed with a stirrer. Thereafter it was aged at 50° C. for approximately 15 hours and then was dried at 120° C. Thus transparent dried gel was obtained. This dried gel was heat-treated at 1000° C. for three hours and thereby a sample was obtained.

With respect to the light-emitting bodies (samples) produced in Examples 1 to 6 and Comparative Examples 1 to 3, the following emission evaluation was carried out. The results are shown together in Table 1.

[Emission Evaluation]

Each light-emitting body produced above was excited and allowed to emit light by ultraviolet rays, in which blue-violet visible light was reduced considerably through an ultraviolet transmission filter (Trade Name: RR340, manufactured by Asahi Spectra Co., Ltd.), from a commercial black light (NEOBALL 5 Black Light; manufactured by TOSHIBA LIGHTING & TECHNOLOGY CORPORATION; 15 W; wavelength range: 300 nm to 420 nm; peak wavelength: 352 nm). The emission state thereof was observed visually and thereby the emission color and emission intensity were evaluated relatively.

TABLE 1

| | State of Sample | Emission Color | Emission Intensity |
|---|---|---|---|
| Example 1 | transparent | blue-violet | high |
| Example 2 | transparent | blue-violet | high |
| Example 3 | transparent | blue-white | high |
| Example 4 | transparent | blue-white | high |
| Example 5 | transparent | green | high |
| Example 6 | transparent | red | high |
| Comparative Example 1 | transparent | light blue | considerably low |
| Comparative Example 2 | transparent | red | considerably low |
| Comparative Example 3 | transparent | green | low |

The diameters of the fine phosphor particles dispersed in the samples obtained in Examples 1 to 6 were measured using a transmission electron microscope. It was confirmed that all of them were in the range of 50 nm or less. When such fine particles are used, diffusion of visible light can be prevented sufficiently and thereby high transparency can be obtained. In addition, the transmission electron microscope makes it possible to observe fine phosphor particles in the form of nanoparticles with a lattice pattern.

Example 7

0.09 g of the sample (form: powder; average particle diameter: 30 μm) obtained in Example 6 was added to 2.9 g of transparent unsaturated polyester resin (Trade Name: RIGOLAC2004WM-2, manufactured by SHOWA HIGHPOLYMER CO., LTD.). Furthermore, 0.06 g of curing agent (t-butyl peroxy 2-ethylhexanoate, Trade Name: Kayaester O-50, manufactured by Kayaku Akzo Corporation) was added thereto. Then while this was stirred with a stirrer, vacuum defoaming was carried out. Thus a liquid resin containing the light-emitting body dispersed therein was obtained. This liquid resin was poured into a mold and was cured at 90° C. Thus a resin sheet with a thickness of 1 mm was produced.

Reference Example 1

A resin sheet was produced in the same manner as in Example 7 except that commercial red phosphors $Y_2O_2S$:$Eu^{3+}$ (average diameter: 10 μm) were used instead of the sample of Example 6.

With respect to the resin sheets produced in Example 7 and Reference Example 1, the transparency evaluation described below and the emission evaluation described above were carried out. The results are shown in Table 2.

[Transparency Evaluation]

Using a spectrophotometer (manufactured by Hitachi, Ltd., U-3210), the total light transmittance at a wavelength of 550 nm was measured with respect to the direction of the thickness of each resin sheet.

TABLE 2

|  | Total Light Transmittance (%) | Emission Color | Emission Intensity |
|---|---|---|---|
| Example 7 | 91.3 | red | high |
| Reference Example | 35.7 | red | high |

Example 8

<<Preparation of $Sr_4Al_{14}O_{25}$:$Eu^{2+}$/$SiO_2$ Light-Emitting Flake>>

0.446 g of strontium carbonate (reagent; with a purity of at least 99.9%), 0.012 g of europium acetate tetrahydrate (reagent; with a purity of at least 99.9%), and 4.002 g of aluminum nitrate nonahydrate (reagent; with a purity of at least 99.9%) were dissolved in a solvent composed of 3.704 g of purified water. Furthermore, 0.103 g of oxalic acid (special grade reagent, with a purity of at least 98%) was dissolved therein. Then 2.776 g of 28% ammonia was dripped thereinto while this was stirred. In addition, 25.0 g of colloidal silica (SILICADOL30, manufactured by Nippon Chemical Industrial Co., Ltd., particle diameter: about 10 nm) was added thereto. Then this was stirred and thus a first solution was prepared.

2.11 g of TMOS (Trade Name: KBM04, manufactured by Shin-Etsu Chemical Co., Ltd.) was dissolved in 9.16 g of 2-propanol (special grade reagent). Furthermore, 4.643 g of 60% nitric acid was added thereto. Then this was stirred and thus a second solution was obtained. The second solution was added to the first solution and then this was stirred. Thereafter, it was aged at 50° C. for approximately 15 hours. Thus a coating solution was obtained.

The coating solution thus obtained was applied onto a film made of polyethylene terephthalate (PET) using a coater bar and then was dried at 100° C. for approximately 10 seconds. Thereafter, a gel film was removed with a scraper in water. This gel film was dried and then was baked at 1000° C. for three hours. Thus a flake-shaped light-emitting body (sample) with a thickness of 1 μm was obtained. In this sample, $Sr_4Al_{14}O_{25}$:$Eu^{2+}$ fine phosphor particles are present in a ratio of 9.0 mol % with respect to the whole.

Example 9

<<Preparation of $BaMg_2Al_{16}O_{27}$:$Eu^{2+}$, $Mn^{2+}$/$SiO_2$ Light-Emitting Flake>>

0.099 g of barium acetate (reagent; with a purity of at least 99.9%), 0.167 g of magnesium acetate tetrahydrate (reagent; with a purity of at least 99.9%), 2.331 g of aluminum nitrate nonahydrate (reagent; with a purity of at least 99.9%), 0.031 g of europium acetate tetrahydrate (reagent; with a purity of at least 99.9%), and 0.007 g of manganese acetate tetrahydrate (reagent; with a purity of at least 99.9%) were dissolved in a solvent composed of 0.388 g of 60% nitric acid and 5.208 g of purified water. Furthermore, 0.052 g of oxalic acid (special grade reagent, with a purity of at least 98%) was dissolved therein. Then 1.202 g of 28% ammonia was dripped thereinto while this was stirred. In addition, 11.895 g of colloidal silica (SILICADOL30, manufactured by Nippon Chemical Industrial Co., Ltd., particle diameter: about 10 nm) was added thereto. This was stirred and thus a first solution was prepared.

1.005 g of TMOS (Trade Name: KBM04, manufactured by Shin-Etsu Chemical Co., Ltd.) was dissolved in 6.325 g of 2-propanol (special grade reagent). Furthermore, 1.475 g of 60% nitric acid was added thereto. Then this was stirred and thus a second solution was obtained. The second solution was added to the first solution and then this was stirred. Thereafter, it was aged at 50° C. for approximately 15 hours. Thus a coating solution was obtained.

The coating solution thus obtained was applied onto a film made of polyethylene terephthalate (PET) using a coater bar and then was dried at 100° C. for approximately 10 seconds. Thereafter, a gel film was removed with a scraper in water. This gel film was dried and then was baked at 1000° C. for three hours. Thus a flake-shaped light-emitting body (sample) with a thickness of 1 μm was obtained. In this sample, $BaMg_2Al_{16}O_{27}$:$Eu^{2+}$, $Mn^{2+}$ fine phosphor particles are present in a ratio of 8.79 mol % with respect to the whole.

Example 10

<<Preparation of $Y_2SiO_5$:$Ce^{3+}$, $Tb^{3+}$/$SiO_2$ Light-Emitting Flake>>

2.234 g of yttrium acetate tetrahydrate (reagent; with a purity of at least 99.9%), 0.310 g of terbium acetate tetrahydrate (reagent; with a purity of at least 99.9%), 0.100 g of cerium nitrate hexahydrate (reagent; with a purity of at least 99.9%), and 0.503 g of TMOS (Trade Name: KBM04, manufactured by Shin-Etsu Chemical Co., Ltd.) were dissolved in a solvent composed of 1.301 g of 60% nitric acid and 3.301 g of purified water. Furthermore, 1.488 g of urea (reagent; with a purity of at least 99%) and 0.045 g of oxalic acid (special grade reagent, with a purity of at least 98%) were dissolved therein. Then this was heated to 90° C. and was stirred for one hour. Furthermore, 14.0 g of colloidal silica (SILICADOL30, manufactured by Nippon Chemical Industrial Co., Ltd., particle diameter: about 10 nm) was added thereto. This was stirred and thus a first solution was prepared.

1.18 g of TMOS (Trade Name: KBM04, manufactured by Shin-Etsu Chemical Co., Ltd.) was dissolved in 4.55 g of 2-propanol (special grade reagent). Furthermore, 1.142 g of 60% nitric acid was added thereto. Then this was stirred and thus a second solution was obtained. The second solution was added to the first solution and then this was stirred. Thereafter, it was aged at 50° C. for approximately 15 hours. Thus a coating solution was obtained.

The coating solution thus obtained was applied onto a film made of polyethylene terephthalate (PET) using a coater bar and then was dried at 100° C. for approximately 10 seconds. Thereafter, a gel film was removed with a scraper in water. This gel film was dried and then was baked at 1000° C. for three hours. Thus a flake-shaped light-emitting body (sample) with a thickness of 1 μm was obtained. In this sample, $Y_2SiO_5:Ce^{3+}$, $Tb^{3+}$ fine phosphor particles are present in a ratio of 14.2 mol % with respect to the whole.

Example 11

<<Preparation of $Y_2SiO_5:Ce^{3+}$, $Tb^{3+}/SiO_2$ Light-Emitting Flake>>

0.745 g of yttrium oxide (reagent; with a purity of at least 99.99%), 0.310 g of terbium acetate tetrahydrate (reagent; with a purity of at least 99.9%), 0.100 g of cerium nitrate hexahydrate (reagent; with a purity of at least 99.9%), and 0.503 g of TMOS (Trade Name: KBM04, manufactured by Shin-Etsu Chemical Co., Ltd.) were dissolved in a solvent composed of 2.600 g of 60% nitric acid and 3.296 g of purified water. Furthermore, 0.045 g of oxalic acid (special grade reagent, with a purity of at least 98%) was dissolved therein. Then 1.202 g of 28% ammonia was dripped thereinto while this was stirred. In addition, 11.895 g of colloidal silica (SILICADOL30, manufactured by Nippon Chemical Industrial Co., Ltd., particle diameter: about 10 nm) was added thereto. This was stirred and thus a first solution was prepared.

1.004 g of TMOS (Trade Name: KBM04, manufactured by Shin-Etsu Chemical Co., Ltd.) was dissolved in 6.316 g of 2-propanol (special grade reagent). Furthermore, 1.672 g of 60% nitric acid was added thereto. Then this was stirred and thus a second solution was obtained. The second solution was added to the first solution and then this was stirred. Thereafter, it was aged at 50° C. for approximately 15 hours. Thus a coating solution was obtained.

The coating solution thus obtained was applied onto a film made of polyethylene terephthalate (PET) using a coater bar and then was dried at 100° C. for approximately 10 seconds. Thereafter, a gel film was removed with a scraper in water. This gel film was dried and then was baked at 1000° C. for three hours. Thus a flake-shaped light-emitting body (sample) with a thickness of 1 μm was obtained. In this sample, $Y_2SiO_5:Ce^{3+}$, $Tb^{3+}$ fine phosphor particles are present in a ratio of 14.2 mol % with respect to the whole.

Figure 3:
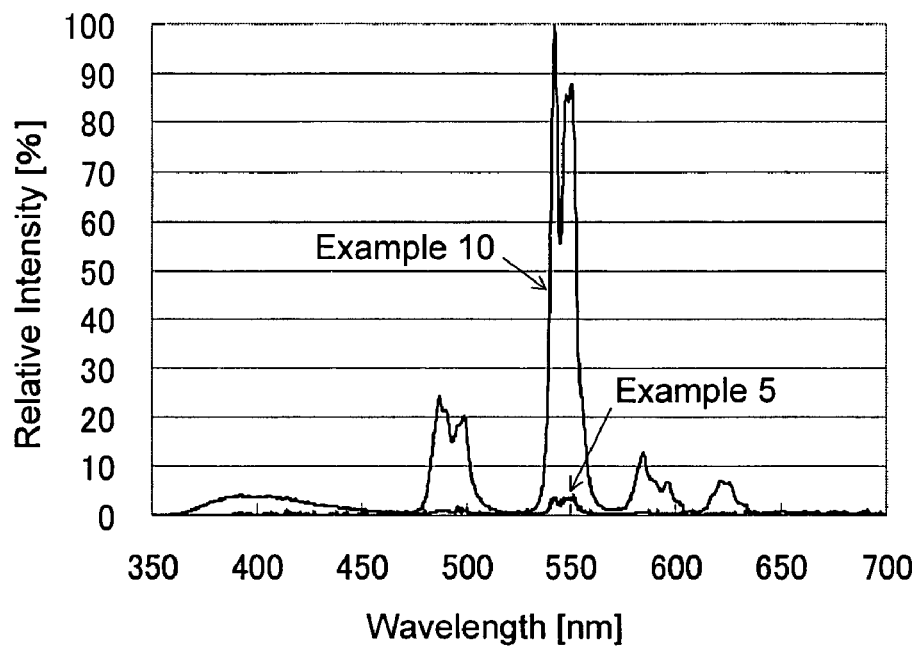
FIG. 3 shows emission spectra of light-emitting bodies according to Examples 5 and 10.

As can be seen from FIG. 3, the light-emitting body obtained in Example 10 exhibited the emission intensity that was about 20 times the emission intensity of the light-emitting body obtained in Example 5. The emission intensity of the light-emitting body obtained in Example 10 was equivalent to that of the light-emitting body obtained in Example 9.

Example 12

<<Preparation of $La_2O_2S:Eu^{3+}/SiO_2$ Light-Emitting Flake>>

0.868 g of lanthanum oxide (reagent; with a purity of at least 99.99%) and 0.534 g of europium acetate tetrahydrate (reagent; with a purity of at least 99.9%) were dissolved in a solvent composed of 1.696 g of 60% nitric acid and 3.0 g of purified water. Furthermore, 0.067 g of oxalic acid (special grade reagent, with a purity of at least 98%) was dissolved therein. Then 1.213 g of 28% ammonia was dripped thereinto while this was stirred. In addition, 12.0 g of colloidal silica (SILICADOL30, manufactured by Nippon Chemical Industrial Co., Ltd., particle diameter: about 10 nm) was added thereto. This was stirred and thus a first solution was prepared.

1.01 g of TMOS (Trade Name: KBM04, manufactured by Shin-Etsu Chemical Co., Ltd.) was dissolved in 5.80 g of 2-propanol (special grade reagent). Furthermore, 1.906 g of 60% nitric acid was added thereto. Then this was stirred and thus a second solution was obtained. The second solution was added to the first solution and then this was stirred. In addition, 0.207 g of sodium thiosulfate pentahydrate was dissolved therein. Thereafter, it was aged at 50° C. for approximately 15 hours. Thus a coating solution was obtained.

The coating solution thus obtained was applied onto a film made of polyethylene terephthalate (PET) using a coater bar and then was dried at 100° C. for approximately 10 seconds. Thereafter, a gel film was removed with a scraper in water. This gel film was dried and then was baked at 1000° C. for three hours. Thus a flake-shaped light-emitting body (sample) with a thickness of 1 μm was obtained. In this sample, $La_2O_2S:Eu^{3+}$ fine phosphor particles are present in a ratio of 9.09 mol % with respect to the whole.

Figure 2:
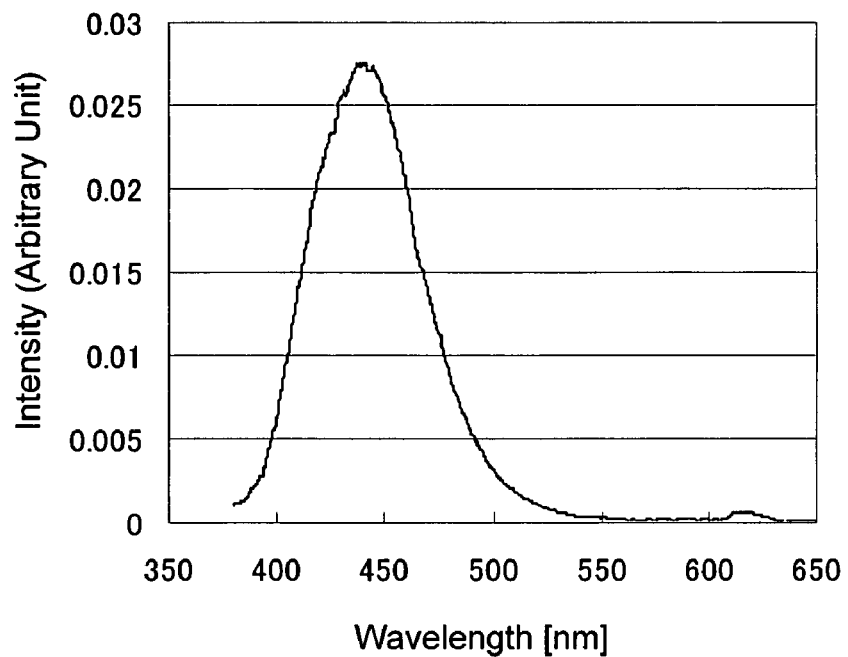
FIG. 2 shows an emission spectrum of a light-emitting body according to Example 9.
Figure 4:
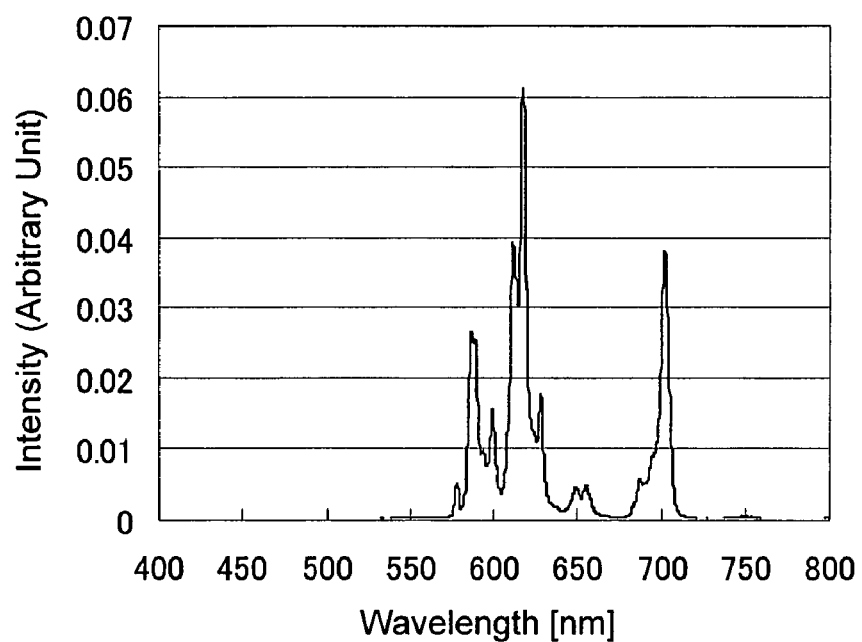
FIG. 4 shows an emission spectrum of a light-emitting body according to Example 12.

FIG. 1 shows an emission spectrum of Example 8, while FIG. 2 shows an emission spectrum of Example 9. FIG. 3 shows emission spectra as a comparison between Example 10 and Example 5. FIG. 4 shows an emission spectrum of Example 12. The emission spectra shown in FIGS. 1 to 4 indicate that intended light-emitting bodies were obtained suitably by the production methods of the present invention. FIGS. 1 and 2 show typical spectra of $Eu^{2+}$, FIG. 3 shows a typical spectrum of $Tb^{3+}$, and FIG. 4 shows a typical spectrum of $Eu^{3+}$. Similarly, with respect to the other examples and comparative examples, it was confirmed by the same emission spectrum measurement that the intended fine phosphor particles had been produced.

[Emission Spectrum Measurement]

The emission spectra were measured using a xenon lamp (Trade Name: Monochrolight MLX1030, manufactured by Koken Kogyo) as an excitation light source, while emission of samples was measured using a fiber multichannel spectroscopic system (Trade Name: USB2000, manufactured by Ocean Optics, Inc.).

Next, a light-emitting body containing fine phosphor particles of an upconversion type was produced.

Example 13

<Preparation of Light-Emitting Body>

1.815 g of yttrium acetate tetrahydrate (reagent; with a purity of at least 99.9%) and 0.022 g of erbium acetate tetrahydrate (reagent; with a purity of at least 99.9%) were dissolved in a solvent composed of 0.564 g of 60% nitric acid and 4.831 g of purified water. Furthermore, 2.418 g of urea (reagent; with a purity of at least 99%) was dissolved therein. Then this was heated to 90° C. and was stirred for one hour. Thereafter, 4.153 g of fine alumina particles (Nanotek A1203, manufactured by C.I. KASEI CO., LTD., particle diameter: about 50 nm) were added thereto. This was stirred and thus a first solution was prepared.

1.096 g of aluminum isopropoxide (first grade reagent) was hydrolyzed with a solvent composed of 6.452 g of 2-propanol (special grade reagent), 3.672 g of purified water, and 1.128 g of 60% nitric acid. Thus a second solution was obtained. The first solution was added to the second solution and then this was stirred. Thereafter, it was aged at 50° C. for approximately 15 hours. Thus a coating solution was obtained.

The coating solution thus obtained was applied onto a film made of polyethylene terephthalate (PET) using a coater bar and then was dried at 100° C. for approximately 10 seconds. Thereafter, a gel film was removed with a scraper in water. This gel film was dried and then was baked at 1000° C. for three hours. Thus a flake-shaped light-emitting body with a thickness of 1 μm was obtained. With respect to the light-emitting body obtained in this example, the following emission evaluation was carried out.

[Emission by Ultraviolet Excitation]

Each light-emitting body material produced above was excited and allowed to emit light by ultraviolet rays, in which blue-violet visible light was reduced considerably through an ultraviolet transmission filter (Trade Name: RR340, manufactured by Asahi Spectra Co., Ltd.), from a commercial black light (NEOBALL 5 Black Light; manufactured by TOSHIBA LIGHTING & TECHNOLOGY CORPORATION; 15 W; wavelength range: 300 nm to 420 nm; peak wavelength: 352 nm). Then, the emission state thereof was observed visually.

[Emission by Infrared Excitation]

Each light-emitting body produced above was excited and allowed to emit light by infrared rays emitted from a semiconductor laser (808 nm, 4 mW). Then the state of the emission of visible light alone that was seen through an infrared cut filter (Trade Name: SXV710, manufactured by Asahi Spectra Co., Ltd.) in the emission region was observed visually. As a result, in each light-emitting body of the present invention, emission in the visible range was visually observable in both the cases of the ultraviolet excitation and the infrared excitation.

Example 14

Example 14 is an example in which the light-emitting body prepared in Example 13 is contained in a coating material. 1 g of light-emitting body prepared in Example 13 was mixed with 9 g (solid content mass) of acrylic resin (manufactured by NIPPON PAINT Co., Ltd., nax Multiclear: one-component base coating material), while it was stirred well using a paint shaker. Thus, a coating solution was obtained. With a coating machine (manufactured by YASUDA-SEIKI-SEI-SAKUSHO, LTD.; Automatic Film Applicator), this solution was applied onto a concealment measurement paper using an applicator for forming a coating film with a thickness of 0.23 mm and a width of 80 mm. Thus a coating film was formed. This coating film was allowed to stand at room temperature and thereby was dried completely. Thereafter, the property and emission state of this coating film were evaluated.

Comparative Example 4

A coating film was produced in the same manner as in Example 14 except that commercial red phosphors $Y_2O_2S$:$Eu^{3+}$ were used instead of the light-emitting body used in Example 14. The coating workability in Comparative Example 4 was evaluated as "poor" since "rubbing" and "catching" occurred.

With respect to the coating films produced in Example 14 and Comparative Example 4, the coating workability evaluation and the aforementioned emission evaluation were carried out. The results are shown in Table 3.

TABLE 3

| | Workability | Emission by Ultraviolet Excitation | Emission by Infrared Excitation |
|---|---|---|---|
| Example 14 | good | visually observable | visually observable |
| Comparative Example 4 | poor | visually observable | visually not observable |

From the above results, in the light-emitting body of the present invention, emission in the visible range was visually observable in both the cases of ultraviolet excitation and infrared excitation even when it was contained in the coating film. In addition, it was found that the light-emitting body of the present invention had good coating workability.

Example 15

0.09 g of light-emitting body according to Example 13 was added to 2.9 g of transparent unsaturated polyester resin (Trade Name: RIGOLAC2004WM-2, manufactured by SHOWA HIGHPOLYMER CO., LTD.). Furthermore, 0.06 g of curing agent (t-butyl peroxy 2-ethylhexanoate (Trade Name: Kayaester O-50, manufactured by Kayaku Akzo Corporation) was added thereto. Then this was subjected to vacuum defoaming while being stirred with a stirrer. Thus a liquid resin was obtained. This liquid resin was poured into a mold and was cured at 90° C. Thus a resin sheet with a thickness of 1 mm was produced.

Comparative Example 5

A resin sheet was produced in the same manner as in Example 15 except that commercial red phosphors $Y_2O_2S$:$Eu^{3+}$ were used instead of the light-emitting body used in Example 15.

With respect to the resin sheets produced in Example 15 and Comparative Example 5, the transparency evaluation described below and the emission evaluation described above were carried out. The results are shown in Table 4.

[Transparency Evaluation]

The total light transmittance at a wavelength of 550 nm was measured using the spectrophotometer (manufactured by Hitachi, Ltd., U-3210).

TABLE 4

| | Total Light Transmittance (%) | Emission by Ultraviolet Excitation | Emission by Infrared Excitation |
|---|---|---|---|
| Example 15 | 90.4 | visually observable | visually observable |
| Comparative Example 5 | 36.9 | visually observable | visually not observable |

From the above results, in the light-emitting body of the present invention, emission in the visible range was visually observable in both the cases of ultraviolet excitation and infrared excitation even when the light-emitting body was contained in a resin. In addition, it was found that the light-emitting body had excellent transparency when being contained in a resin.

INDUSTRIAL APPLICABILITY

The present invention provides new light-emitting bodies having excellent transparency containing phosphors used therein and therefore has great utility value in various lighting body and light source fields.

The invention claimed is:

1. A light-emitting body, comprising phosphor particles dispersed in an oxide matrix, the phosphor particles containing at least one selected from an oxide and an oxysulfide as a parent material, the light-emitting body having a shape of flake or fiber, wherein:
    the parent material comprises at least one selected from silicate, aluminate and oxysulfide;
    the silicate is at least one selected from $Ca_2Al_2SiO_7$ and $Y_2SiO_5$;
    the aluminate is at least one selected from $SrAl_2O_4$, $Sr_4Al_{14}O_{25}$, and $BaMg_2Al_{16}O_{27}$; and
    the oxysulfide is at least one selected from $Y_2O_2S$ and $La_2O_2S$.

2. The light-emitting body according to claim 1, wherein the phosphor particles contain at least one selected from Ce, Eu, Th, Mn, and Mg as an activator element.

3. The light-emitting body according to claim 1, wherein the oxide matrix contains at least one selected from silicon oxide and aluminum oxide.

4. The light-emitting body according to claim 1, wherein the phosphor particles have a diameter of 1 μm or smaller.

5. The light-emitting body according to claim 1, wherein the phosphor particles are of an upconversion type that can emit visible light by infrared or near-infrared exciting light.

6. The light-emitting body according to claim 5, wherein the phosphor particles contain at least one selected from Er, Ho, Pr, Tm, Nd, Gd, Eu, Yb, Sm, and Ce as an activator element.

7. The light-emitting body according to claim 6, wherein the activator element is Er.

8. A resin composition comprising a light-emitting body, the light-emitting body comprising phosphor particles dispersed in an oxide matrix, the phosphor particles containing at least one selected from an oxide and an oxysulfide as a parent material, the light-emitting body having a shape of flake or fiber.

9. The resin composition according to claim 8, having a light transmittance of at least 80% at a wavelength of 550 nm in a direction of its thickness when being formed to have a thickness of 1 mm.

10. The resin composition according to claim 9, containing at least 1 mass % of the light-emitting body.

11. A coating material comprising a light-emitting body, the light-emitting body comprising phosphor particles dispersed in an oxide matrix, the phosphor particles containing at least one selected from an oxide and an oxysulfide as a parent material, the light-emitting body having a shape of flake or fiber.

12. An ink composition comprising a light-emitting body, the light-emitting body comprising phosphor particles dispersed in an oxide matrix, the phosphor particles containing at least one selected from an oxide and an oxysulfide as a parent material, the light-emitting body having a shape of flake or fiber.

13. A coated paper comprising a light-emitting body, the light-emitting body comprising phosphor particles dispersed in an oxide matrix, the phosphor particles containing at least one selected from an oxide and an oxysulfide as a parent material, the light-emitting body having a shape of flake or fiber.

14. A light-emitting body, comprising phosphor particles dispersed in an oxide matrix, the phosphor particles containing at least one selected from an oxide and an oxysulfide as a parent material, the light-emitting body having a form of flake or fiber, wherein:
    when the light-emitting body has the form of flake, an average particle diameter is 100 μm or smaller;
    when the light-emitting body has the form of fiber, a fiber diameter is 30 μm or smaller, and a fiber length is 25 mm or shorter;
    the parent material is at least one selected from silicate and oxysulfide
    the silicate is at least one selected from $Ca_2Al_2SiO_7$ and $Y_2SiO_5$; and
    the oxysulfide is at least one selected from $Y_2O_2S$ and $La_2O_2S$.

15. The light-emitting body according to claim 14, wherein the phosphor particles contain at least one selected from Ce, Eu, Th, Mn, and Mg as an activator element.

16. The light-emitting body according to claim 14, wherein the oxide matrix contains at least one selected from silicon oxide and aluminum oxide.

17. The light-emitting body according to claim 14, wherein the phosphor particles have a diameter of 1 μm or smaller.

18. A light-emitting body comprising phosphor particles dispersed in an oxide matrix, the phosphor particles containing at least one selected from an oxide and an oxysulfide as a parent material, the light-emitting body having a form of flake or fiber, wherein:
    when the light-emitting body has the form of flake, an average particle diameter is 100 μm or smaller;
    when the light-emitting body has the form of fiber, a fiber diameter is 30 μm or smaller, and a fiber length is 25 mm or shorter; and
    the phosphor particles are of an upconversion type that can emit visible light by infrared or near-infrared exciting light.

19. The light-emitting body according to claim 18, wherein the phosphor particles contain at least one selected from Er, Ho, Pr, Tm, Nd, Gd, Eu, Yb, Sm, and Ce as an activator element.

20. The light-emitting body according to claim 19, wherein the activator element is Er.

21. A light-emitting body comprising phosphor particles dispersed in an oxide matrix, the phosphor particles containing at least one selected from an oxide and an oxysulfide as a parent material, the light-emitting body having a form of flake or fiber wherein:
    when the light-emitting body has the form of flake, an average particle diameter is 100 μm or smaller;
    when the light-emitting body has the form of fiber, a fiber diameter is 30 μm or smaller, and a fiber length is 25 mm or shorter; and
    the parent material is composed substantially of an oxide.

22. The light-emitting body according to claim 21, wherein the oxide is yttria ($Y_2O_3$).

23. A resin composition, comprising a light-emitting body, the light-emitting body comprising phosphor particles dispersed in an oxide matrix, the phosphor particles containing at least one selected from an oxide and an oxysulfide as a parent material, the light-emitting body having a form of flake or fiber, wherein:
    when the light-emitting body has the form of flake, an average particle diameter is 100 μm or smaller; and
    when the light-emitting body has the form of fiber, a fiber diameter is 30 μm or smaller, and a fiber length is 25 mm or shorter.

24. A coating material comprising a light-emitting body, the light-emitting body comprising phosphor particles dispersed in an oxide matrix, the phosphor particles containing at least one selected from an oxide and an oxysulfide as a parent material, the light-emitting body having a form of flake or fiber, wherein:
- when the light-emitting body has the form of flake, an average particle diameter is 100 μm or smaller; and
- when the light-emitting body has the form of fiber, a fiber diameter is 30 μm or smaller, and a fiber length is 25 mm or shorter.

25. An ink composition comprising a light-emitting body, the light-emitting body comprising phosphor particles dispersed in an oxide matrix, the phosphor particles containing at least one selected from an oxide and an oxysulfide as a parent material, the light-emitting body having a form of flake or fiber, wherein:
- when the light-emitting body has the form of flake, an average particle diameter is 100 μm or smaller; and
- when the light-emitting body has the form of fiber, a fiber diameter is 30 μm or smaller, and a fiber length is 25 mm or shorter.

26. A coated paper comprising a light-emitting body, the light-emitting body comprising phosphor particles dispersed in an oxide matrix, the phosphor particles containing at least one selected from an oxide and an oxysulfide as a parent material the light-emitting body having a form of flake or fiber, wherein:
- when the light-emitting body has the form of flake, an average particle diameter is 100 μm or smaller; and
- when the light-emitting body has the form of fiber, a fiber diameter is 30 μm or smaller, and a fiber length is 25 mm or shorter.

27. A light-emitting body, comprising phosphor particles dispersed in an oxide matrix, the phosphor particles containing at least one selected from an oxide and an oxysulfide as a parent material, the light-emitting body having a shape of flake or fiber,
- wherein the phosphor particles are of an upconversion type that can emit visible light by infrared or near-infrared exciting light.

* * * * *